(12) United States Patent
Grimes et al.

(10) Patent No.: US 7,882,393 B2
(45) Date of Patent: Feb. 1, 2011

(54) IN-BAND PROBLEM LOG DATA COLLECTION BETWEEN A HOST SYSTEM AND A STORAGE SYSTEM

(75) Inventors: Andrew W. Grimes, Tucson, AZ (US); Nikhil Khandelwal, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 11/692,223

(22) Filed: Mar. 28, 2007

(65) Prior Publication Data
US 2008/0244331 A1    Oct. 2, 2008

(51) Int. Cl.
*G06F 11/00* (2006.01)
(52) U.S. Cl. .............................. 714/25; 714/15; 714/45
(58) Field of Classification Search .................... 714/15, 714/25, 45
See application file for complete search history.

(56) References Cited

U.S. PATENT DOCUMENTS

| | | | |
|---|---|---|---|
| 5,463,768 A | 10/1995 | Cuddihy et al. | |
| 5,485,573 A | 1/1996 | Tandon | |
| 5,555,389 A * | 9/1996 | Satoh et al. | 711/100 |
| 5,619,644 A * | 4/1997 | Crockett et al. | 714/45 |
| 5,740,357 A | 4/1998 | Gardiner et al. | |
| 5,761,212 A | 6/1998 | Foland, Jr. et al. | |
| 6,101,588 A | 8/2000 | Farley | |
| 6,148,414 A | 11/2000 | Brown et al. | |
| 6,199,104 B1 | 3/2001 | Delph | |
| 6,223,544 B1 | 5/2001 | Seem | |
| 6,247,103 B1 * | 6/2001 | Kern et al. | 711/162 |
| 6,345,369 B1 | 2/2002 | Kitamorn et al. | |

(Continued)

FOREIGN PATENT DOCUMENTS

GB    2405501 A    3/2005

(Continued)

OTHER PUBLICATIONS

Basham et al., "Preemptive Data Protection for Copy Services in Storage Systems and Applications", U.S. Appl. No. 11/464,320, filed Aug. 14, 2006.

(Continued)

*Primary Examiner*—Christopher S McCarthy
(74) *Attorney, Agent, or Firm*—Stephen R. Tkacs; Stephen J. Walder, Jr.; Randall J. Bluestone

(57) ABSTRACT

A mechanism for in-band problem log data collection is provided. Facilities are provided for a host system, host application, or server system to instigate a state save operation in a storage system utilizing direct commands in response to an error or failure. The host system may include an application program interface (API) to force the storage device to collect a set of state save data for debug purposes at a specific time interlocked with a host system log. The API of the illustrative embodiments may be provided in a failover driver and/or host bus adapter (HBA) driver in the prime code path such that first time data capture following an error is maximized. Since the host system is instigating the state save operation with direct commands, a larger amount of transient data may be collected to provide more comprehensive state information for debugging purposes.

22 Claims, 5 Drawing Sheets

U.S. PATENT DOCUMENTS

| | | |
|---|---|---|
| 6,643,802 B1 | 11/2003 | Frost et al. |
| 6,769,071 B1* | 7/2004 | Cheng et al. .................... 714/4 |
| 6,772,290 B1* | 8/2004 | Bromley et al. ............. 711/118 |
| 6,802,020 B1 | 10/2004 | Smith |
| 6,880,101 B2 | 4/2005 | Golasky et al. |
| 6,948,102 B2 | 9/2005 | Smith |
| 7,003,702 B2 | 2/2006 | Budd et al. |
| 7,032,019 B1 | 4/2006 | Noguchi et al. |
| 7,120,832 B2 | 10/2006 | Collins et al. |
| 7,210,071 B2 | 4/2007 | Deacon et al. |
| 7,240,234 B2 | 7/2007 | Morita et al. |
| 7,370,241 B2 | 5/2008 | Nicholson et al. |
| 7,409,594 B2 | 8/2008 | Mukherjee et al. |
| 7,676,702 B2 | 3/2010 | Basham et al. |
| 2003/0061331 A1 | 3/2003 | Nakamura et al. |
| 2003/0079074 A1 | 4/2003 | Sicola et al. |
| 2003/0120751 A1 | 6/2003 | Husain et al. |
| 2003/0140278 A1 | 7/2003 | Holland et al. |
| 2003/0140299 A1 | 7/2003 | Duncan et al. |
| 2003/0221155 A1 | 11/2003 | Weibel et al. |
| 2004/0015722 A1 | 1/2004 | Klotz et al. |
| 2004/0047354 A1 | 3/2004 | Slater et al. |
| 2004/0139168 A1 | 7/2004 | Tanaka et al. |
| 2004/0153728 A1 | 8/2004 | Suzuki et al. |
| 2004/0225926 A1 | 11/2004 | Scales et al. |
| 2004/0243796 A1 | 12/2004 | Keohane et al. |
| 2005/0015647 A1 | 1/2005 | Okada et al. |
| 2005/0015685 A1 | 1/2005 | Yamamoto |
| 2005/0022064 A1 | 1/2005 | Steinmetz et al. |
| 2005/0044162 A1* | 2/2005 | Liang et al. ................. 709/212 |
| 2005/0081080 A1 | 4/2005 | Bender et al. |
| 2005/0166084 A1 | 7/2005 | Yagisawa et al. |
| 2005/0216800 A1 | 9/2005 | Bicknell et al. |
| 2006/0080430 A1 | 4/2006 | Barsuk |
| 2006/0107129 A1 | 5/2006 | Franklin et al. |
| 2006/0129759 A1 | 6/2006 | Bartlett et al. |
| 2006/0168471 A1 | 7/2006 | Schulstad |
| 2008/0126857 A1 | 5/2008 | Basham et al. |
| 2008/0178048 A1 | 7/2008 | Balazich et al. |
| 2008/0244331 A1* | 10/2008 | Grimes et al. ................. 714/48 |
| 2008/0320332 A1 | 12/2008 | Brown et al. |

FOREIGN PATENT DOCUMENTS

| | | |
|---|---|---|
| JP | 55-108064 | 8/1980 |
| WO | WO 2006/053898 A2 | 5/2006 |

OTHER PUBLICATIONS

"Execution Time Dynamic Data Collection at First Detection of Failure", IBM Corporation, Technical Disclosure Bulletin, TDB v.37 n6B, Jun. 1994, pp. 391-392.

Bancroft et al., "Functionality and Performance Evaluation of File Systems for Storage Area Networks (SAN)", IEEE Symposium on Mass Storage Systems, 2000, pp. 101-119.

J. Menon et al., "IBM Storage Tank—A heterogeneous scalable SAN file system", IBM Systems Journal, vol. 42, No. 2, 2003, pp. 250-267.

Mesnier et al., "Storage Area Networking—Object-Based Storage", IEEE Communications Magazine, vol. 41, No. 8, Aug. 2003, pp. 84-90.

Agrawal et al., "Policy-Based Validation of SAN Configuration", Proceedings of the Fifth IEEE International Workshop on Policies for Distributed Systems and Networks, 2004, 10 pages.

U.S. Appl. No. 11/464,320, filed Aug. 14, 2006, Basham et al.

U.S. Appl. No. 11/766,492, filed Jun. 21, 2007, Brown et al.

Wang et al., "A High Density Two Dimensional Bar Code", Proceedings of the SPIE vol. 1384 High-Speed Inspection Architectures, Barcoding, and Character Recognition (1990), Nov. 5-7, 1990, pp. 169-175.

Barcaroli, Giulio, "An Integrated System for Edit and Imputation of Data in the Italian National Statistical Institute", Survey and Statistical Computing, Sep. 24-26, 1992, pp. 167-177.

Clark, Tom, "A Management Strategy for Fibre Channel-Arbitrated Loop", Internet Citation, [Online] XP002979440, http://www.networkbuyersguide.com/search/309003.htm, Mar. 1998, 10 pages.

Communication pursuant to Article 94(3) EPC; Application No. 08 717 036.1—1225; Apr. 20, 2010, 4 pages.

USPTO U.S. Appl. No. 11/464,320, Image File Wrapper printed from PAIR on May 18, 2010, 3 pages.

USPTO U.S. Appl. No. 11/766,492, Image File Wrapper printed from PAIR on May 18, 2010, 2 pages.

Troppens, Ulf et al., "Storage Networks Explained", Storage Networks Explained: Basics and Application of Fibre Channel SAN, NAS, iSCSI, InfiniBand and FCoE, Second Edition, 2009, 6 pages.

Supplemental Notice of Allowability mailed Jun. 23, 2010 for U.S. Appl. No. 11/766,492; 13 pages.

* cited by examiner

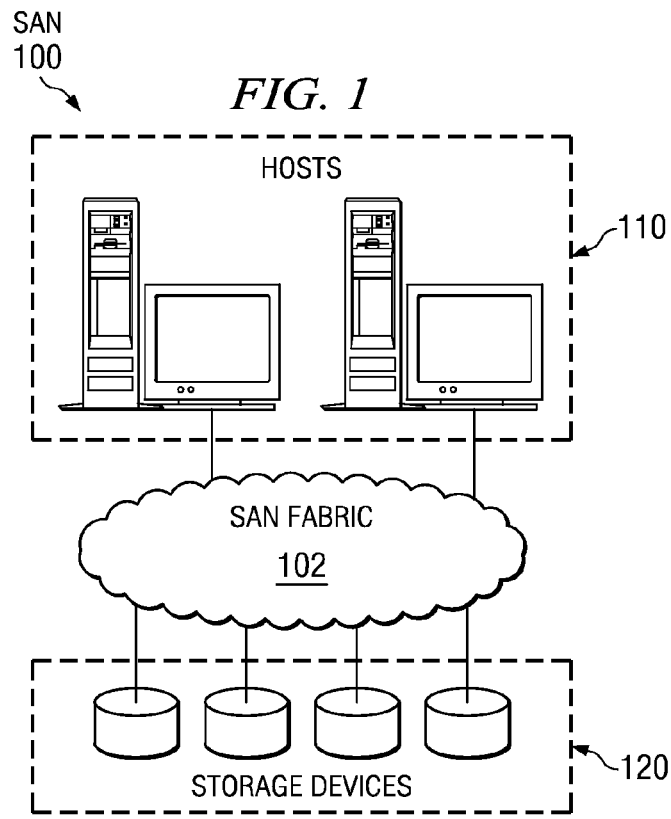

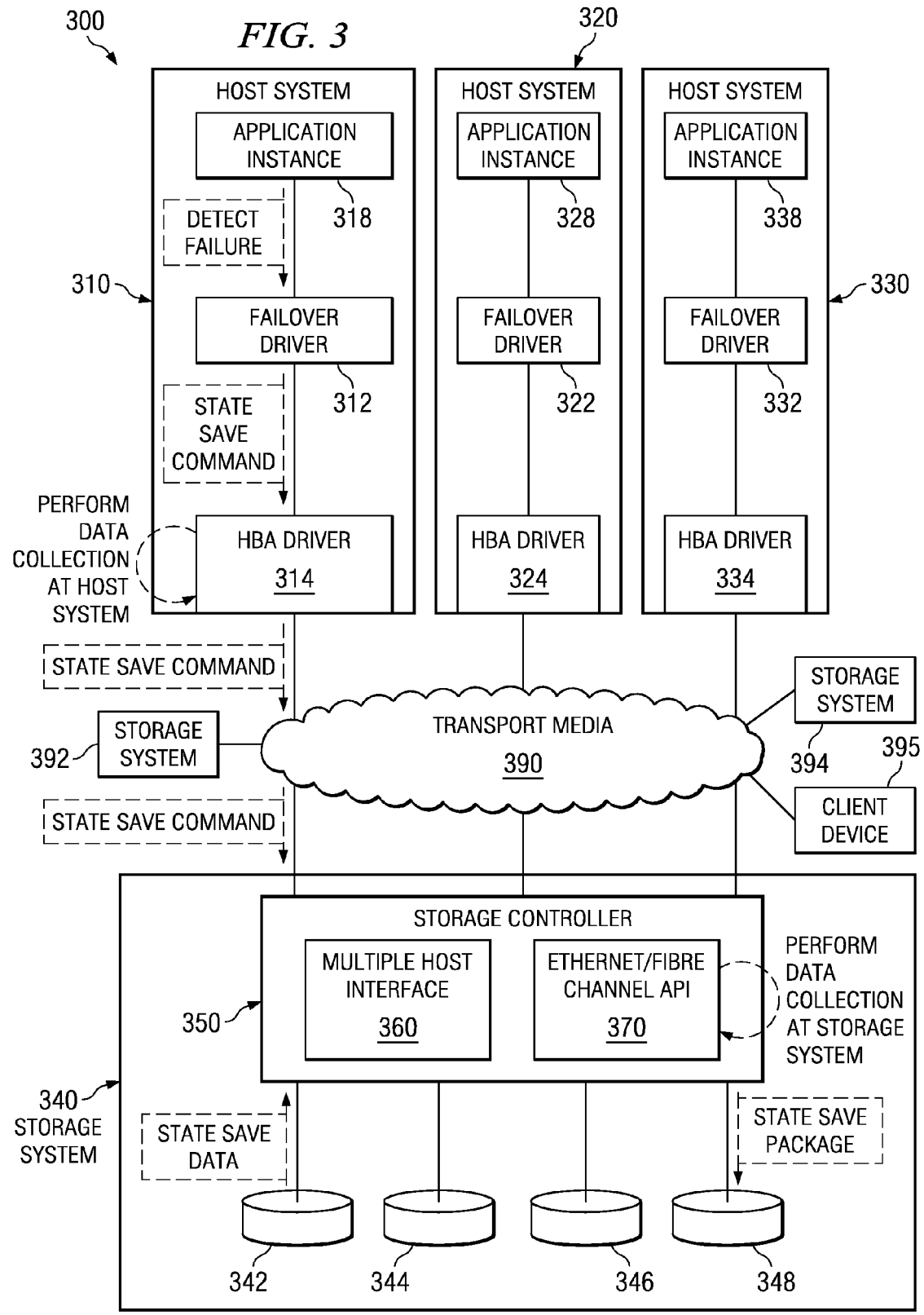

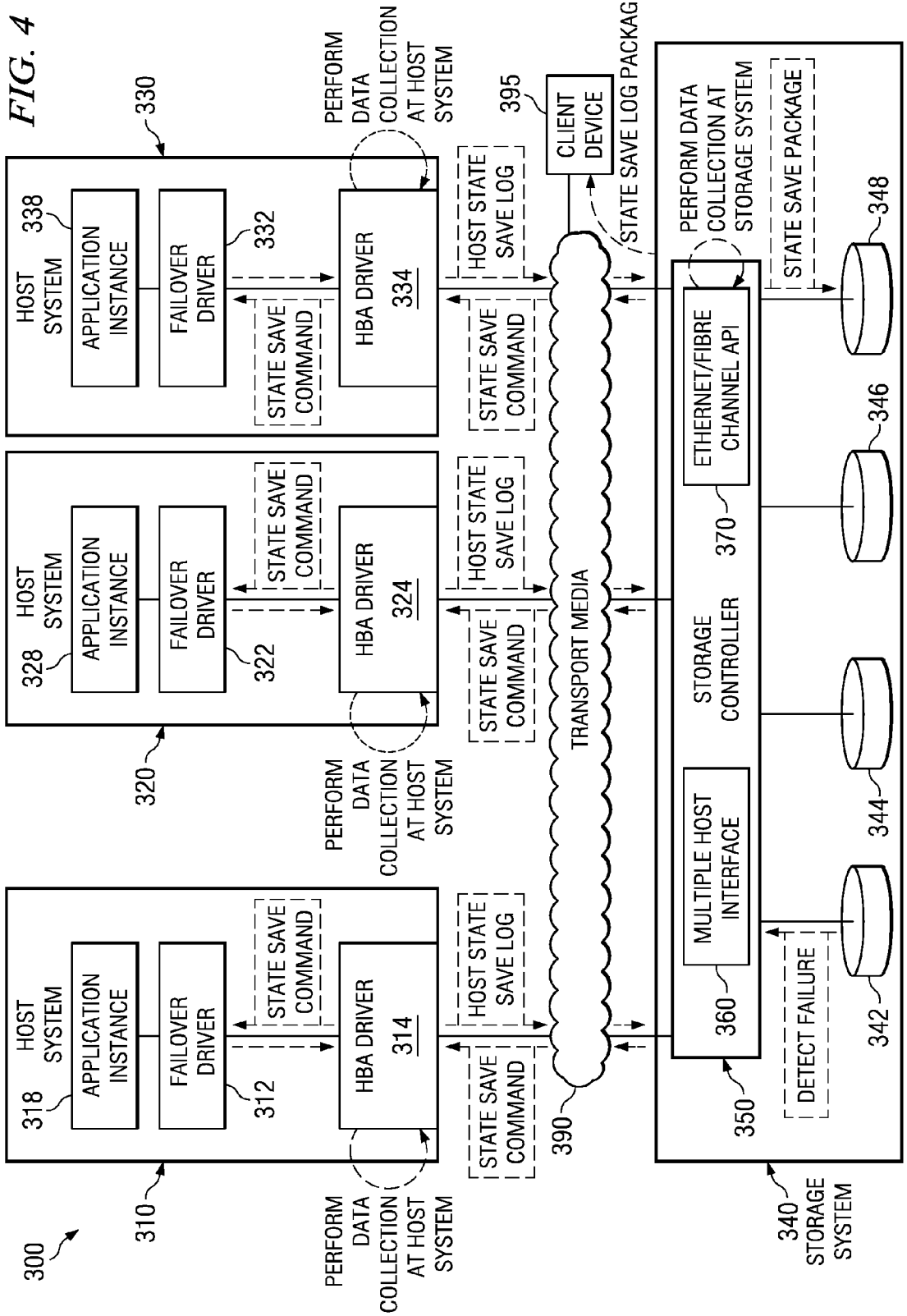

IN-BAND PROBLEM LOG DATA COLLECTION BETWEEN A HOST SYSTEM AND A STORAGE SYSTEM

BACKGROUND

1. Technical Field

The present application relates generally to an improved data processing system and method. More specifically, the present application is directed to a system and method for in-band problem log data collection between a host system and a storage system.

2. Description of Related Art

A storage area network (SAN) is a network of storage disks. In typical large enterprise implementations, a SAN connects multiple servers to a centralized pool of storage systems. Compared to managing hundreds of servers, each with its own disks, SANs improve system administration. By treating all of a company's storage as a single resource, disk maintenance and routine backups are easier to schedule and control. SANs, as well as other network data processing systems, include multiple layers, such as applications, database applications, file systems, host server systems, network infrastructure, and storage systems.

In modern SAN environments, a failure can be very difficult to debug since SAN environments tend to be very complex. Typically the component in the SAN environment that detects the failure and collects data to determine the root of the problem is a different component than the one that experiences the failure. As a result, the problem leading to the failure is often solved after the failure is detected and is often solved by utilizing external instrumentation and customization on the components of the SAN environment. This usually requires a "retest" of the circumstances that led to the failure that was detected, i.e. recreating the conditions in the SAN environment that led to the failure so that data collection may be performed to determine the cause of the failure. This recreation may encompass having to scan log data structures for information relevant to a determined point-in-time of the failure and then correlating this information from the various logs to attempt to obtain a picture of the state of the system at the time of the failure after the fact.

Because failure detection and data collection is typically performed by a separate component from the one that experiences the failure, data collection from multiple components in the complex SAN environment can often times miss critical information that may aid in debugging the failure due to latency in communications and activation through slower interfaces. Thus, frequently, data from remote host systems, switches, or other storage devices at various layers of the SAN environment, is not available or is collected long after the error condition leading to the failure has passed. For example, some components of the SAN element, e.g., host bus adapter (HBA) buffers, store very small amounts of data, e.g., only a few frames of data stored at a time, that may be quickly overwritten and lost when the failure is not detected and data collection is not performed until a significant amount of time after the failure occurs due to latencies in the mechanisms used to detect failures and collect data. As a result, and also because of the limited logging capability of known SAN environments, some information is lost in the process.

SUMMARY

In one illustrative embodiment, a method is provided for collecting data corresponding to a failure in a data processing system. The method may comprise receiving a failure notification of a failure condition of a component of a data processing system in a network comprising a plurality of data processing systems. The method may further comprise receiving state save data from the plurality of data processing systems in the network, wherein the state save data is generated in the plurality of data processing systems in response to an in-band state save command. The state save data may be output for use in resolving the failure condition of the component, wherein the in-band state save command is a command issued across a data channel between a first data processing system and at least one second data processing system in the plurality of data processing systems.

The first data processing system may be, for example, a storage system and the at least one second data processing system may be, for example, at least one host system. The in-band state save command may be sent from a storage controller of the storage system to the at least one host system in response to the failure condition being a failure of a storage device in the storage system. The in-band state save command may be issued to a plurality of host systems via a multi-host system interface of the storage system which establishes a data channel with each of the host systems in the plurality of host systems. The state save data may be collected by each of the plurality of host systems and provided to the storage controller via the data channels established by the multi-host system interface. The state save data collected by each of the plurality of host systems may be packaged together with state save data from the storage system into a single data package associated with the detected failure condition.

A further illustrative method embodiment may comprise detecting, by one of at least one driver executing on a host system, in the data processing system, or a storage controller of a storage system, in the data processing system, a failure condition of a component of the data processing system. An in-band state save command may be issued from one of the at least one driver or the storage controller to the other of the at least one driver or the storage controller. State save data for the host system and the storage system may be collected in response to issuing the in-band state save command. The state save data for the host system and the storage system may be output to a client device for use in resolving the failure condition of the component. The in-band state save command may be a command issued across a data channel between the host system and the storage controller.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiments.

In yet another illustrative embodiment, a system is provided. The system may comprise at least one host system and a storage system coupled to the at least one host system. The at least one host system and/or the storage system may perform various ones, and combinations of, the operations outlined above with regard to the method illustrative embodiments.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 depicts a pictorial representation of a storage area network in which aspects of the illustrative embodiments may be implemented;

FIG. 2 is a block diagram of an exemplary data processing system in which aspects of the illustrative embodiments may be implemented;

FIG. 3 is an exemplary block diagram illustrating an exemplary operation of the primary operational components of the illustrative embodiments in response to a failure of a host application;

FIG. 4 is an exemplary block diagram illustrating an exemplary operation of the primary operational components of the illustrative embodiments in response to a failure of a storage device in a storage system;

DETAILED DESCRIPTION OF THE ILLUSTRATIVE EMBODIMENTS

Figure 5:
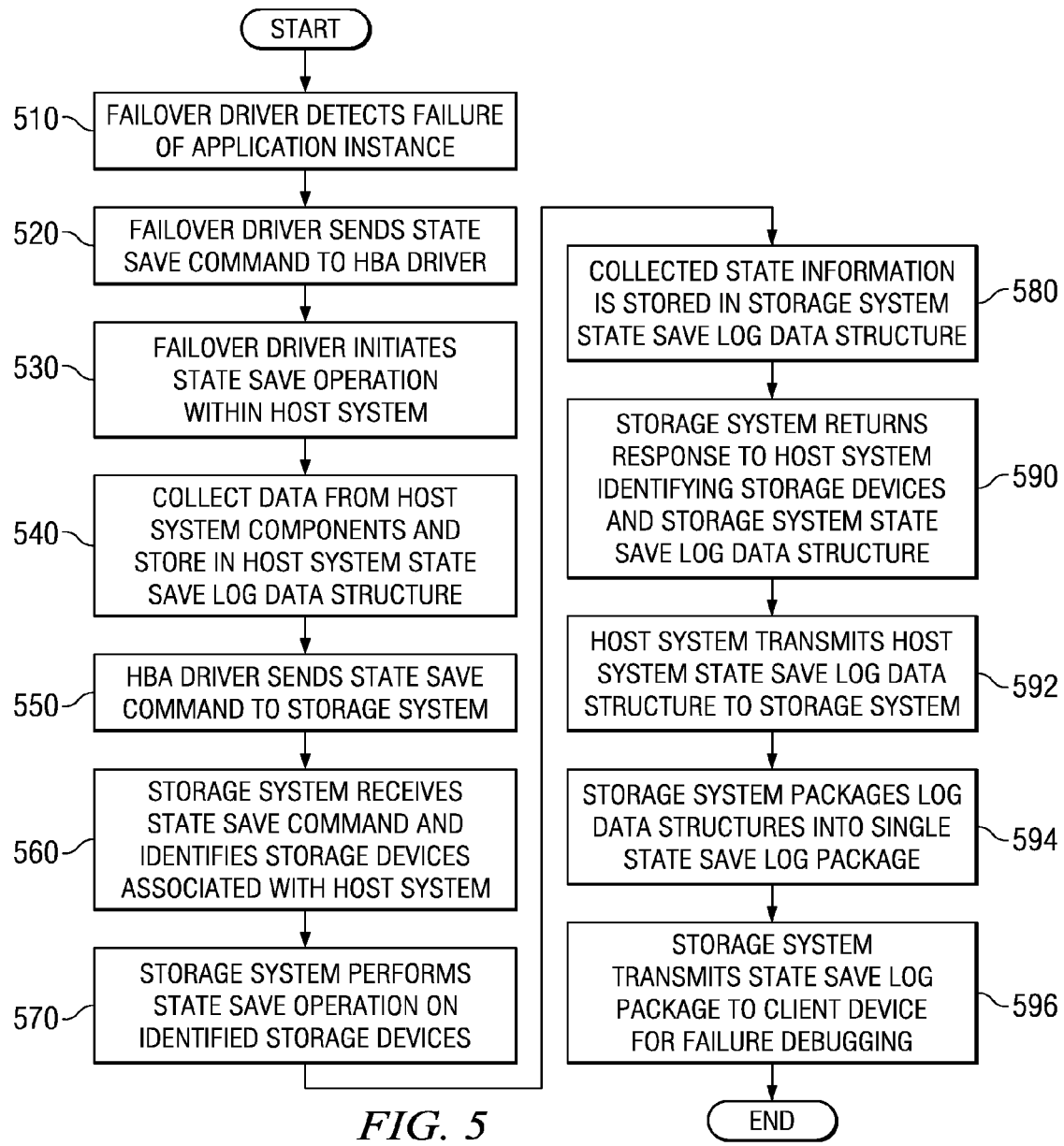
FIG. 5 is a flowchart outlining an exemplary operation for performing data collection in response to a host application failure in accordance with one illustrative embodiment.

The illustrative embodiments provide a system and method for in-band problem log data collection between a host system and a storage system. The system and method of the illustrative embodiments may be implemented in a distributed data processing environment, such as a storage area network (SAN), or the like. Thus, in order to provide a context in which to understand the primary operational components of the illustrative embodiments, FIGS. 1-2 are provided hereafter as an exemplary data processing environment and an exemplary data processing device in which exemplary aspects of the illustrative embodiments may be implemented. FIG. 3 is provided as an example of the multiple layers of a storage area network from which data may be collected by the mechanisms of the illustrative embodiments.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a storage area network in which aspects of the illustrative embodiments may be implemented. Storage area network (SAN) 100 contains SAN fabric 102, which is a combination of interconnected switches, which collectively provide a routing infrastructure within SAN 100.

In the depicted example, hosts 110 are connected to SAN fabric 102 along with storage systems, or devices, 120. Hosts 110 may be, for example, personal computers, network computers, servers, or the like. In the depicted example, hosts 110 access storage systems/devices 120 through paths in the SAN fabric. SAN 100 may include additional hosts and/or other storage devices not shown. FIG. 1 is intended as an example, and not as an architectural limitation for the present invention.

SAN fabric 102 is the medium used to provide communication links between various devices and computers connected together within SAN 100. SAN fabric 102 may include connections, such as wire, wireless communication links, or fiber optic cables. In one embodiment, SAN fabric 102 may represent a collection of networks and gateways that use the Transmission Control Protocol/Internet Protocol (TCP/IP) suite of protocols to communicate with one another. Of course, SAN fabric 102 may also be implemented to include a number of different types of networks, such as for example, fibre channel, Ethernet, serial attached small computer systems interface (serial attached SCSI or SAS), or the like. In fact, many current SANs use Fibre channel for data transfer and Ethernet for communications of management information.

As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, typically, if there is a failure of a component in the SAN 100, a component of the SAN 100 external to the component that experiences the failure must detect the failure and initiate data collection for debug purposes. As a result, the data that is collected for debug purposes is often collected long after the error condition has passed and the limited logging capability of the SAN components means that some information may be lost in the latency period.

The illustrative embodiments provide a mechanism by which a host system, such as host 110, may initiate a "state save" operation on both the host system 110 and the storage system 120 in the event of a failure of a host application. Moreover, the illustrative embodiments provide a mechanism by which a storage system, such as storage system 120, may initiate a "state save" operation on the host systems 110, which may be a plurality of host systems, and the storage system 120 in response to a detected failure of a storage device in the storage system 120.

It should be appreciated that while the illustrative embodiments will be described with regard to particular elements of the host system 110 and the storage system 120 performing certain operations, the illustrative embodiments are only exemplary of possible implementations of the present invention and are not intended to state or imply any limitation with regard to the elements that may perform the described operations. Thus, for example, operations attributable to the storage controller of a storage system 120 may equally be performed in a driver executing on the host system 110, or vice versa. Furthermore, a separate device from either the host system or the storage system may be provided for performing the various operations outlined hereafter with regard to the illustrative embodiments. Other modifications to the illustrative embodiments, as will be readily apparent to those of ordinary skill in the art in view of the present description, may be made without departing from the spirit and scope of the present invention.

Moreover, it should be appreciated that while the illustrative embodiments are concerned with state save operations in a storage area network (SAN) between a storage system and one or more host systems, the illustrative embodiments and the present invention are not limited to such. Rather, the mechanisms of the illustrative embodiments may be utilized with any network of data processing systems and/or devices, e.g., server systems, client devices, workstations, or the like, in which a state save operation is desirable in the event of a failure. Thus, the present invention is not limited to state save operations in host systems and storage systems and other environments are considered to be within the spirit and scope of the present invention.

In the illustrative embodiments, the "state save" operation, i.e. a dump of all registers of one or more to a log file, is initiated with in-band commands, i.e. commands generated within the communication protocol infrastructure as part of the prime code path, that create a point-in-time freeze of all the components at approximately the time of the failure. These commands instruct the host system and the storage system to perform data collection at the time of the original failure rather than utilizing an external component that may perform such data collection at a later time after detection of the failure, as in the known systems. The data collection may be performed across multiple components of the SAN substantially immediately, or substantially in real time, following the occurrence of the failure. As a result, the amount of data associated with the actual conditions at the time of the failure that may be collected in the "state save" operation is maximized since the time frame for performing the data collection is as close to the actual failure as possible.

In one illustrative embodiment, facilities are provided for a host system 110, host application, server system, or the like to instigate a state save operation in a storage system, e.g., storage system 120, utilizing direct commands in response to an error or failure. In one illustrative embodiment, the host system 110 includes an application program interface (API) to force the storage system 120 to collect a set of state save data for debug purposes at a specific time interlocked with a host system log.

The API of the illustrative embodiments may be provided, for example, in a failover driver and/or host bus adapter (HBA), for example. Thus, the API may be provided in the prime code path such that first time data capture following an error or failure is maximized by increasing the amount of data available on the initial detection of the error or failure. The API provides a functionality for exchanging a command that requests a state save operation from the storage system 120. The storage system 120 utilizes a communication channel API, e.g., an Ethernet or Fibre channel API, to receive the command and process it.

Logic included in the storage system 120 may include a frequency functionality to determine if a state save operation has already been taken within a predetermined period of time to avoid over-saturating the storage system 120 with state save commands. A host log may be generated on the host system 110 with the details of what storage system 120 or storage device(s) in the storage system 120 performed the state save operation and the name of the state save data files that were collected.

The illustrative embodiments further provide facilities for data collection which utilize the data channels used by host systems 110 for communication with storage systems, e.g., storage system 120, to request and transfer host side logs and data during a data collection activity for debugging a storage failure. The system and method of the illustrative embodiments utilize a failover driver to collect host system logs, failover driver logs, host configuration data, firmware/software levels, and basic configuration data, and transfer it to the storage system 120. The storage system 120 may then package the host system data as part of its state save data for problem determination and failure condition resolution.

The API in the failover driver may recognize the storage command to collect data sent from the storage system, and may itself collect the set of host side state save data, e.g., host system logs, failover driver logs, etc., in an archive file of an interim directory. The API in the failover driver may then negotiate with the storage device to open a data channel to transfer the archived file.

The support on the storage system 120 for the data collection involves including a multiple host interface system that can interact with commands to the host failover drivers of a plurality of host systems 110. The multiple host interface system handles requests for data and opens a data channel to transfer data from the host systems 110. The storage system 120 may create a temporary storage location on a storage medium, e.g., a hard disk, to temporarily store the state save data from potentially multiple host systems 110 and then package all storage system state data with host system state data. The multiple host interface system further provides facilities for transferring the collected host and storage system state data package to a client system for use in debugging the storage system failure.

Thus, as mentioned above, one of the advantages of the illustrative embodiments over known methods of failure data collection is that the data collection performed by the illustrative embodiments is performed at the time of the original failure. Rather than using an external component in the SAN, from the components involved in the failure, in order to detect a failure and perform data collection, the illustrative embodiments provide mechanisms within the communication path between a host system and a storage system. The mechanisms force a host system and/or storage system pause in all components as data is collected from the system components including components, e.g., registers, that have extremely short term traces, such as host bus adapter (HBA) buffers and the like. Thus, the mechanisms of the illustrative embodiments perform data collection in such a manner that short term trace information is able to be collected immediately upon occurrence of the failure.

FIG. 3 is an exemplary block diagram illustrating an exemplary operation of primary operational components in response to a failure of a host application. It should be appreciated that the operational components shown in FIG. 3 may be implemented in hardware, software, or any combination of hardware and software. In a preferred embodiment, the operational components are implemented as software instructions executed by one or more processors.

As shown in FIG. 3, a storage area network (SAN) 300 may be comprised of a plurality of host systems 310-330 and a plurality of storage systems 340, 392, and 394. For purposes of this description, only one storage system, i.e. storage system 340, is shown in detail in FIG. 3.

As shown in FIG. 3, the storage system 340 includes a plurality of storage devices 342-348, a storage controller 350, and a multiple host interface 360 provided in the storage controller 350. The storage controller 350 of the storage subsystem 340 may further include an application program interface (API) 370, which may be provided as an Ethernet or Fibre channel API, for example, for receiving state save commands from the host systems 310-330. In one or more of the storage devices 342-348, a state save data structure is provided for storing state save data collected from the storage system 340 and one or more of the host systems 310-330.

The host systems 310-330 include a host bus adapter (HBA) driver 314, 324, and 334, and a failover driver 312, 322, and 332. The HBA drivers 314, 324, and 334 and the failover drivers 312, 322, and 332 include an API, provided in microcode, which permits the exchange of commands that request state save operations to be performed in the storage devices 342-348 of the storage system 340. For example, the failover drivers 312, 322, and 332 may have an API/CIMOM for communicating with storage devices 342-348 to pass on a "take a state save" command for instructing the storage devices to initiate a state save operation.

In operation, the host systems 310-330 run various applications which may access storage devices 342-348 of the storage system 340. During execution of the applications, a failure may occur in an application instance causing a need to collect data regarding the state of the host systems 310-330 and the storage system 340 for use in debugging or otherwise identifying the source of the error leading to the failure. The microcode APIs of the failover drivers 312, 322, and 332, provide the functionality for detecting the failure of the application and issuing a state save command to the HBA drivers 314, 324, and 334 for performing data collection.

In typical systems, failures are detected and reported to a host system log, but there are typically time lags of minutes or hours before the host system gets failure data. With the mechanisms of the illustrative embodiments, a state save is performed substantially immediately upon detection of the failure. This gives an increased probability of gathering a maximum amount of data for the root cause analysis.

The microcode APIs of the HBA drivers 314, 324, and 334 provide the functionality for issuing a state save command to the storage system 340 via a transport media 390, such as a data network or SAN fabric, e.g., SAN fabric 102 in FIG. 1, comprising one or more switches, routers, or the like. Such a state save command is an "in-band" command sent from the HBA drivers 314, 324, and 334 to the storage system 340 directly via existing Ethernet or Fibre channel data channels. The term "in-band" refers to the ability to send a command within the same path as a data channel. Known systems use out-of-band methods, i.e. an error is detected in a Fibre channel adapter channel and the command to collect data is sent by an Ethernet command path external to the data channel, i.e. the Fibre channel adapter channel. This requires a redundant path and the maintenance of an additional connection with its associated latency.

With known systems, manual scripts are used to monitor error logs passively with an event trigger switch in code. This introduces a considerable amount of latency. With the illustrative embodiments herein, logic is provided in the driver stack that is part of the error path so that it is activated at the same time the error is detected, not indirectly through the passive monitoring of an error log that may take several seconds to print out and react to.

Thus, when the failure of an application instance 318 in host system 310, for example, is detected by the failover driver 312, the failover driver 312 immediately sends a state save operation command to the HBA driver 314 via a data channel between the host system 310 and the storage system 340. The state save operation command causes the HBA driver 314 to immediately pause the operations in the host system 310 and perform data collection of various host system state data, e.g., host system logs, failover driver logs, host configuration data, firmware/software levels, basic configuration data, HBA register information, application log information, and the like. This pause essentially causes the host system 310 to maintain its current state for a brief amount of time, e.g., a few milliseconds, so that registers and in-flight log information may be stored. Any operations that are attempted during this brief pause time interval may be returned with a "busy" response and may be retried at a later time.

Because this operation is performed substantially immediately after the occurrence of the failure in the host system 310, and is initiated within the host system 310 that experiences the failure, by virtue of the failover driver 312, the data collection may collect data from devices in the host system 310 that have extremely short term traces, such as HBA buffers which typically only store a few frames of data at a time and thus, may be quickly overwritten. Because of the latency in known systems, due to an external device being utilized to detect the failure and initiate data collection, such short term trace data may be lost by the time the data collection is performed.

In addition to initiating the data collection in response to receiving the state save command from the failover driver 312, the HBA driver 314 further sends a state save command to the storage system 340 via the transport media 390. The state save command sent to the storage system 340 is a direct command sent via the existing, and still operating, Ethernet/Fibre channel connection between the host system 310 and the storage system 340. The state save command sent to the storage system 340 is an "in-band" command that is sent by the Ethernet/Fibre channel elements provided in the host system 310 and received by Ethernet/Fibre channel elements at the storage system 340.

The storage system 340 receives the state save command in the Ethernet/Fibre channel API 370 of the storage controller 350. The Ethernet/Fibre channel API 370 processes the state save command to perform data collection at the storage system 340. As part of this processing, the Ethernet/Fibre channel API 370 may perform a frequency determination to determine if a state save command from the host system 310 has already been processed within a predetermined period of time. In this way, the Ethernet/Fibre channel API 370 avoids over-saturating the storage device(s) 342-348 with state save requests. If a previous state save command has been received by the Ethernet/Fibre channel API 370 from the storage system 340 within the predetermined period of time, then another state save operation may not be performed in response to the failure detection.

The Ethernet/Fibre channel API 370 may identify the storage devices 342-348 that are associated with the host system 310 that sent the state save command and may then initiate a pause or point-in-time freeze of the identified storage device(s) 342-348 associated with the host system 310. Again, the pause, or point-in-time freeze pauses the activity of the storage devices 342-348 for a brief time (a few milliseconds), e.g., they return a "busy" response, such that the state of the storage devices 342-348 may be captured. All activity will retry after the pause time period is over.

Once the storage devices 342-348 associated with the host system 310 are paused, the Ethernet/Fibre channel API 370 may then initiate a state save operation, e.g., a dump of register values, on the identified storage device(s) 342-348 to thereby generate a storage system log file in a temporary storage location of another storage device, e.g., storage device 348, or a separate temporary storage device (not shown). In this way, the register values, at substantially the time of the failure in the host system 310, of the storage device(s) 342-348 associated with the host system 310 may be preserved for later use in debugging the cause of the failure.

The Ethernet/Fibre channel API 370 may report back to the host system 310 the details of which storage device(s) 342-348 data was collected from for the storage system state save log data structure and the name of the state save log data structure created by the storage system 340. This information may be reported back to the host system 310 so that a user is informed of the location and information of the data collection in their host log data structure. In this way, an additional indication that a failure has occurred is provided to the user and an indication of where the data associated with the failure is on the storage system may be provided. This information may be used to generate a problem ticket to indicate the time of the failure and which data files should be collected as part of the problem ticket. This may also aid with application debugging.

Thus, the information identifying the storage device(s) 342-348 from which data was collected may be stored in a host log data structure along with the state save data collected from the host system 310 by the HBA driver 314 in response to the state save command from the failover driver 312. In this way, the host log data structure may be used to access the storage system's state save log data structure when performing failure debugging. The host log data structure may then be transmitted to a client device 395, such as via the transport media 390, for use in performing failure debugging in accordance with any known, or later developed, failure debugging methodology.

Alternatively, in response to the storage system 340 returning the information about the storage system's state save log data structure, the host system 310 may transmit the host system's log data structure to the storage system 340 for packaging with the storage system's state save log data structure. The resulting package may be stored in a storage device, e.g. storage device 348, of the storage system 340 for later transmission to a client device 395, via the transport media 390 for example, for use in failure debugging.

Thus, with the operation and mechanisms outlined in FIG. 3 above, in the event of a failure of an application instance 318 on a host system 310, data collection may be performed virtually immediately upon detection of the failure within the host system 310. As a result, it is unlikely that data loss will be experienced. Moreover, since the state save commands are sent to the storage system 340 via direct commands of the Ethernet/Fibre channel mechanisms, any latency experienced in sending the state save command is minimized and the storage device(s) 342-348 associated with the host system 310 that experienced the fault may be paused virtually immediately following the detection of the failure in the host system 310. A state save operation may then be performed on the storage device(s) 342-348.

In this way, a maximum amount of state data may be collected and compiled into log data structures that are already correlated with a particular point-in-time of the detected failure of the host system 310. The log data structures may be packaged together so as to provide a single package of information directly related to the failure. There is no need to scan log files to attempt to identify entries corresponding to a time point of a failure, as is performed in known systems, since the packaged data is already guaranteed to be relevant to the point-in-time of the detected failure in the host system 310.

FIG. 4 is an exemplary block diagram illustrating an exemplary operation of the primary operational components of the illustrative embodiments in response to a failure of a storage device in a storage system. The components shown in FIG. 4 are essentially the same as those shown in FIG. 3. The operation in FIG. 4, however, occurs in response to the storage system 340 detecting a failure in a storage device 342-348 of the storage system 340. It should be appreciated that, within a SAN 300, both operations shown in FIG. 3 and FIG. 4 may be performed depending upon where a failure may occur.

As shown in FIG. 4, sometime during normal operation of the SAN 300, a failure of a storage device, e.g., storage device 342, in the storage system 340 may occur. Examples of such a failure may include, a storage controller reboot, loss of a path or connection, multiple drive failures, a transient code hang/bug that prevents access to data, or the like.

The storage controller 350, which manages the storage system 340 and its storage devices 342-348, may detect this failure of a storage device 342 in any of a number of different ways. For example, the storage controller 350 may perform a ping of the storage device 342 and determine if a response is received. A heartbeat signal based mechanism may be utilized for detecting a failure. A timeout mechanism may be utilized that detects when a communication from a storage device has not been received within a predetermined period of time. Any known, or later developed, mechanism for detecting the failure of a storage device 342 in a storage system 340 may be utilized without departing from the spirit and scope of the present invention.

In response to detecting the failure of the storage device 342, for example, the storage controller 350, in accordance with its internal logic, issues a state save command to the host systems 310-330 via its multiple host interface 360. The multiple host interface 360 may establish data channels, if the data channels are not already established, with the host systems 310-330 for sending host state save data from the host systems 310-330 to the storage system 340. The establishment of data channels via Ethernet/Fibre channel in this manner is generally known in the art.

The multiple host interface 360 sends an in-band state save command to the host systems 310-330, via the established data channels requesting that the host systems 310-330 perform a pause or point-in-time freeze of their state and perform a state save operation. Meanwhile, the storage controller 350 initiates a state save operation within the storage system 340 with regard to the failed storage device 342. That is, the storage controller 350 pauses or performs a point-in-time freeze, of the storage devices 342-348 and causes a dump of the state registers associated with the storage device 342, collects data regarding error conditions and any logs that will wrap, and the like. This information is collected into a state save data structure stored in an established location within the storage system 340, such as on another non-failing storage device, e.g., storage device 348. The collection of this storage system state save data is performed virtually immediately upon detecting the failure of the storage device 342 by the storage controller 350.

At the host systems 310-330, taking host system 310 as exemplary, the state save command issued by the multiple host interface 360 of the storage controller 350 are received by the HBA driver 314 and are provided to the failover driver 312. The failover driver 312 recognizes the state save command and issues an internal state save command to the HBA driver 314. The HBA driver 314 then pauses the operation of the host system 310 and issues commands internally to the host system 310 components to gather basic configuration information, HBA register information, failover driver log information, application log information, and the like. This information is complied into a host state save log data structure stored in the host system 310.

Thereafter, the host state save log data structure is transferred by the host system 310 to the storage controller 350 via the established data channel. The host state save log data structure is packaged with the storage system state save log data structure into one package that comprises all of the state save information for the point-in-time of the failure of the storage device 342. At some time later, the storage controller 350 may then transmit the state save information package to the client device 395, via transport media 390, for use in performing failure debugging operations for isolating the cause of the failure of the storage device 342.

It should be appreciated that this operation may be performed on each of the host systems 310-330 with each host system 310-330 providing a host system state save log data structure to the storage controller 350. The storage controller 350 may package all of the host system state save log data structures together into one package with the storage system's state save log data structure. As a result, a single package of state save log data is generated that is guaranteed to be associated with the point-in-time of the failure of the storage device 342. Thus, a scanning of logs, by an external device, for time points corresponding to a failure is not required when utilizing the mechanisms of the illustrative embodiments to perform failure debugging.

To further illustrate an exemplary operation of the illustrative embodiments, assume a common situation in a runtime environment in which a host system has a problem with accessing a database and, as a result, generates an I/O error in an error log. The storage system 340 is not given any indication that a failure has occurred. With the illustrative embodiments, the failure is communicated to storage system 340 via the application instance 318, the failover driver 312, the HBA driver 314, and the Ethernet/Fibre channel API 370. The failover driver 312 may send a signal frame that tells the storage system 340 that a failure has occurred. The storage system 340 may then initiate a data collection response. The host failover driver 312 and HBA driver 314 collect the host logs, failover driver logs, HBA driver logs, etc., on the host system 310 and stores them in an appropriate directory with a log file having an appropriate time stamp. The storage system 340 forces a state save operation that collects register values, device specific information for all host systems 310-330, error conditions, and any logs that will wrap, into a state save data file. The storage system 340 then creates a temporary storage space on a storage device and transfers the stored log files from the host systems 310-330 to the temporary storage space. All of the log files are then archived into one file with a log indicating the source, time stamp, and system details.

Figure 6:
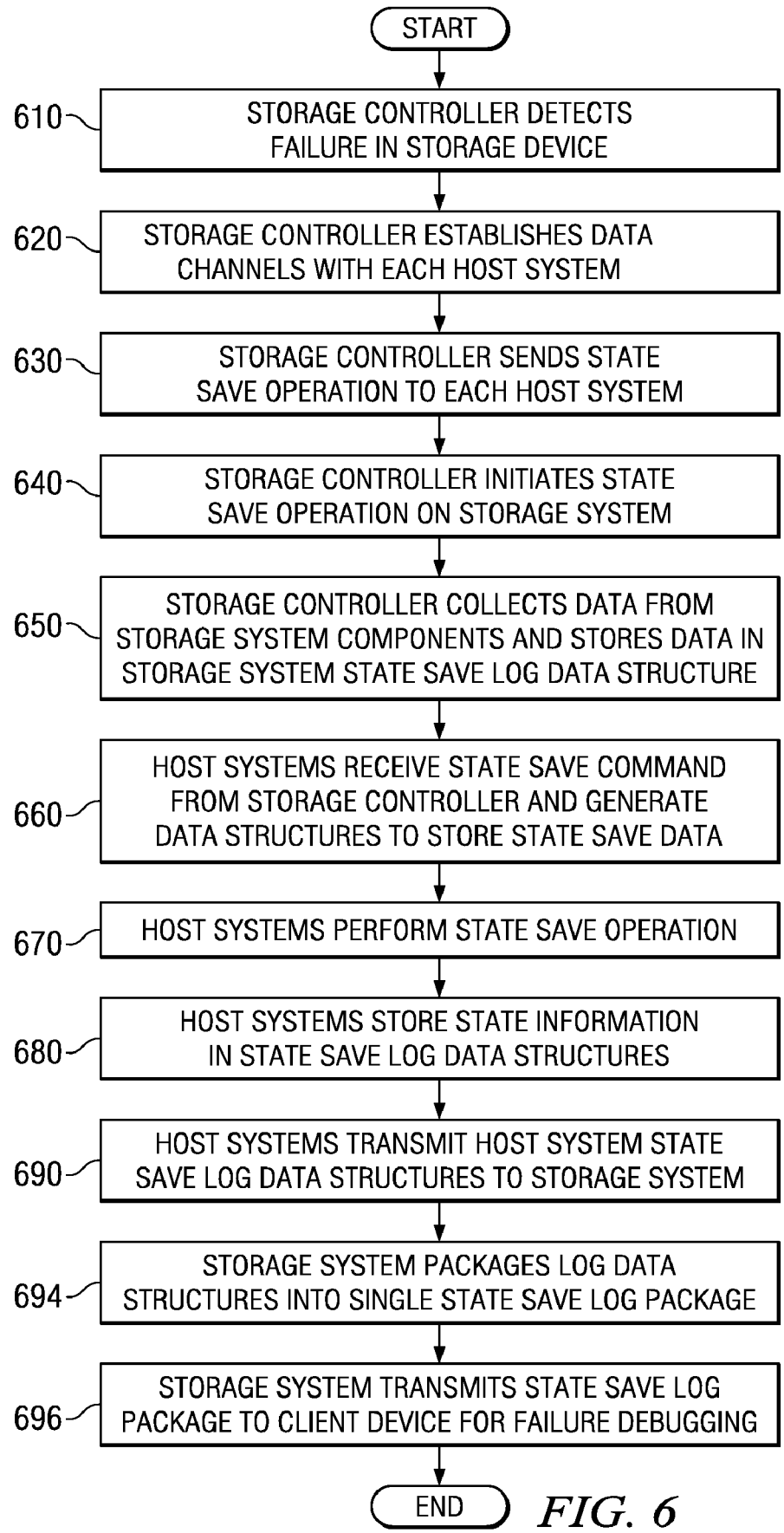
FIG. 6 is a flowchart outlining an exemplary operation for performing data collection in response to a storage device failure in accordance with one illustrative embodiment.

FIGS. 5 and 6 are flowcharts that illustrate exemplary operations for performing data collection in association with SAN component failures in accordance with one illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

FIG. 5 is a flowchart outlining an exemplary operation for performing data collection in response to a host application failure in accordance with one illustrative embodiment. As shown in FIG. 5, the operation starts with the failover driver detecting a failure of an application instance (step 510). The failover driver then sends a state save command to the host bus adapter (HBA) driver (step 520) and initiates a state save operation within the host system (step 530). As part of the state save operation within the host system, the failover driver and/or HBA driver send commands to various host system components for collecting data from these host system components which is then stored in a host system state save log data structure (step 540).

The HBA driver sends the state save command to the storage system (step 550). The storage system receives the state save command from the HBA driver and determines which storage devices correspond to the host system from which the state save command was received (step 560). The storage system then performs a state save operation on the identified storage devices (step 570) and stores the collected state information in a storage system state save log data structure (step 580). The storage system then returns a response to the host system indicating the storage devices affected and the storage system state save log data structure created (step 590).

The host system may then transmit the host system state save log data structure to the storage system (step 592) where the storage system packages the host system state save log data structure with the storage system state save log data structure into a single state save log package (step 594). The state save log package may then be provided to a client device for use in performing failure debugging (step 596). The operation then terminates.

FIG. 6 is a flowchart outlining an exemplary operation for performing data collection in response to a storage device failure in accordance with one illustrative embodiment. As shown in FIG. 6, the operation starts with the storage controller detecting a failure of a storage device (step 610). The storage controller establishes data channels with each of the host systems it communicates with (step 620) and sends a state save command to each of the host systems (step 630). The storage controller further initiates a state save operation within the storage system (step 640). As part of the state save operation within the storage system, the storage controller sends commands to various storage system components for collecting data from these storage system components which is then stored in a storage system state save log data structure (step 650).

The host systems receive the state save command from the storage controller and generate data structures in which to store state save information within the host systems (step 660). The host systems then perform a state save operation (step 670) and store the collected state information in host system state save log data structures (step 680). The host systems then transmit the host system state save log data structures to the storage system (step 690) where the storage system packages the host system state save log data structures with the storage system state save log data structure into a single state save log package (step 694). The state save log package may then be provided to a client device for use in performing failure debugging (step 696). The operation then terminates.

Thus, the illustrative embodiments provide a system and method in which mechanisms are provided in each of the host systems and the storage system for facilitating immediate data collection in the event of a failure of an application on a host system or a storage device in the storage system. Because the data collection is performed immediately upon the occurrence of the failure, the data that is collected is maximized. Moreover, data that is very transient, i.e. stored in components that have small trace data storage, is captured by the mechanisms of the illustrative embodiments. Furthermore, the state information gathered from both the host systems and the storage system in response to a detected failure may be packaged together and provided for debugging purposes. As a result, detailed scanning of log files to identify information pertinent to a particular failure is minimized since the data stored in the package is guaranteed to be pertinent to the state of the SAN at the time of the failure.

As mentioned above, it should be appreciated that while the illustrative embodiments will be described with regard to particular elements of the host system and the storage system performing certain operations, the illustrative embodiments are only exemplary of possible implementations of the present invention and are not intended to state or imply any limitation with regard to the elements that may perform the described operations. Thus, for example, operations attributed above to the storage controller of a storage system may equally be performed in a driver executing on the host system, or vice versa. Furthermore, a separate device from either the host system or the storage system may be provided for performing the various operations outlined hereafter with regard to the illustrative embodiments. Other modifications to the illustrative embodiments, as will be readily apparent to those of ordinary skill in the art in view of the present description, may be made without departing from the spirit and scope of the present invention.

Moreover, while the illustrative embodiments are concerned with state save operations between a storage system and one or more host systems, the illustrative embodiments and the present invention are not limited to such. Rather, the mechanisms of the illustrative embodiments may be utilized with any network of data processing systems in which a state save operation is desirable in the event of a failure. Thus, the present invention is not limited to state save operations in host systems and storage systems and other environments are considered to be within the spirit and scope of the present invention.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer useable storage medium having a computer readable program stored thereon, wherein the computer readable program, when executed on a computing device, causes the computing device to:

receive a failure notification of a failure condition of a component of a data processing system in a network comprising a plurality of data processing systems;

receive state save data from the plurality of data processing systems in the network, wherein the state save data is generated in the plurality of data processing systems in response to an in-band state save command; and output the state save data for use in resolving the failure condition of the component, wherein the in-band state save command is a command issued across a data channel between a first data processing system and a plurality of second data processing systems in the plurality of data processing systems, wherein the first data processing system is a storage system and the plurality of second data processing systems comprise a plurality of host systems, wherein the in-band state save command is sent from a storage controller of the storage system to the plurality of host systems in response to the failure condition being a failure of a storage device in the storage system;

wherein each of the plurality of host systems runs one or more host applications, a host bus adapter driver, and a failover driver;

wherein the in-band state save command is issued to the plurality of host systems via a multi-host system interface of the storage system which establishes a separate data channel with each of the host systems in the plurality of host systems;

wherein responsive to each of the plurality of host systems receiving the in-band state save command at the respective host bus adapter driver and providing the in-band state save command to the respective failover driver, each of the plurality of host systems collects state save data and provides the collected state save data to the storage controller via the data channels established by the multi-host system interface; and wherein the state save data collected by each of the plurality of host systems is packaged together with state save data from the storage system into a single data package associated with the detected failure condition.

2. The computer program product of claim 1, wherein the computer readable program further causes the computing device to:

request a first state save operation in the plurality of host systems to thereby generate a plurality of host state save log data structures; and request a second state save operation in the storage system to thereby generate a storage system state save log data structure.

3. The computer program product of claim 2, wherein the computer readable program further causes the computing device to:

package the plurality of host state save log data structures with the storage system state save log data structure into a single state save package data structure that is stored in the storage system and is associated with the failure condition, wherein outputting the state save data for use in resolving the failure condition of the component comprises outputting the state save package data structure to a third data processing system.

4. The computer program product of claim 2, wherein the state save data for the plurality of host systems and the storage system are collected substantially immediately upon detection of the failure condition in the component.

5. The computer program product of claim 2, wherein, in response to receiving the request for the first state save operation in the plurality of host systems, the plurality of host systems initiate the first state save operation by pausing an operation of each given host system, retaining a state of components of the given host system, and storing state information of the components of the given host system.

6. The computer program product of claim 5, wherein the components of the given host system include host bus adapter buffers that have short term trace values stored therein, and wherein these short term trace values are collected substantially immediately upon detection of the failure condition.

7. The computer program product of claim 1, wherein the failure condition of the component is detected by a storage controller of the storage system, and wherein the computer readable program causes the computing device to request the state save operation in the plurality of host systems by initiating a state save operation in each of the plurality of host systems, each state save operation generating a separate host state save log data structure that is packaged with the storage system state save log data structure.

8. The computer program product of claim 1, wherein the failover driver a given host system receives the in-band state save command from the first data processing system, and wherein the host bus adapter driver of the given host system initiates a state save operation in the given host system in response to receipt of the in-band state save command.

9. The computer program product of claim 1, wherein the computer readable program further causes the computing device to:
determine if a state save command has been previously received in response to a detected failure condition within a predetermined period of time of the currently detected failure condition, wherein an in-band state save command is issued, state save data is collected, and the state save data is output only if a state save command has not already been previously received within the predetermined period of time.

10. A method, in a computing device, for collecting data corresponding to a failure in a data processing system, comprising:
receiving a failure notification of a failure condition of a component of a data processing system in a network comprising a plurality of data processing systems;
receiving state save data from the plurality of data processing systems in the network, wherein the state save data is generated in the plurality of data processing systems in response to an in-band state save command; and
outputting the state save data for use in resolving the failure condition of the component,
wherein the in-band state save command is a command issued across a data channel between a first data processing system and a plurality of second data processing systems in the plurality of data processing systems, wherein the first data processing system is a storage system and the plurality of second data processing comprise a plurality of host systems, wherein the in-band state save command is sent from a storage controller of the storage system to the plurality of host systems in response to the failure condition being a failure of a storage device in the storage system;
wherein each of the plurality of host systems runs one or more host applications, a host bus adapter driver, and a failover driver;
wherein the in-band state save command is issued to the plurality of host systems via a multi-host system interface of the storage system which establishes a separate data channel with each of the host systems in the plurality of host systems;
wherein responsive to each of the plurality of host systems receiving the in-band state save command at the respective host bus adapter driver and providing the in-band state save command to the respective failover driver, each of the plurality of host systems collects state save data and provides the collected state save data to the storage controller via the data channels established by the multi-host system interface; and
wherein the state save data collected by each of the plurality of host systems is packaged together with state save data from the storage system into a single data package associated with the detected failure condition.

11. The method of claim 10, further comprising:
requesting a first state save operation in the plurality of host systems to thereby generate a plurality of host state save log data structures; and
requesting a second state save operation in the storage system to thereby generate a storage system state save log data structure.

12. The method of claim 11, wherein the state save data for the at least one host system and the storage system are collected substantially immediately upon detection of the failure condition in the component.

13. The method of claim 11, wherein, in response to receiving the request for the first state save operation in the plurality of host systems, the plurality of host systems initiates the first state save operation by pausing an operation of each given host system within the plurality of host systems, retaining a state of components of the given host system, and storing state information of the components of the given host system.

14. The method of claim 13, wherein the components of the given host system include host bus adapter buffers that have short term trace values stored therein, and wherein these short term trace values are collected substantially immediately upon detection of the failure condition.

15. The method of claim 11, further comprising:
packaging the plurality of host state save log data structures with the storage system state save log data structure into a single state save package data structure that is stored in the storage system and is associated with the failure condition, wherein outputting the state save data for use in resolving the failure condition of the component comprises outputting the state save package data structure to a third data processing system.

16. The method of claim 10, wherein the failure condition of the component is detected by a storage controller of the storage system, and wherein requesting the state save operation in the plurality of host systems comprises initiating a state save operation in each of the plurality of host systems, each state save operation generating a separate host state save log data structure that is packaged with the storage system state save log data structure.

17. The method of claim 10, wherein the failover driver of a given host system receives the in-band state save command from the first data processing system, and wherein the host bus adapter driver of the given host system initiates a state save operation in the given host system in response to receipt of the in-band state save command.

18. The method of claim 10, further comprising:
determining if a state save command has been previously received in response to a detected failure condition within a predetermined period of time of the currently detected failure condition, wherein an in-band state save command is issued, state save data is collected, and the state save data is output only if a state save command has not already been previously received within the predetermined period of time.

19. A data processing system, comprising:
a plurality of host systems; and
a storage system coupled to the plurality of host systems, wherein:
one of the plurality of host systems or the storage system receives a failure notification of a failure condition of a component of the data processing system;
the storage system receives first state save data from the plurality of host systems, and collects second state save data from one or more storage devices of the storage system, wherein at least one of the first state save data or the second state save data is generated in response to an in-band state save command;
the storage system outputs the first state save data and second state save data for use in resolving the failure condition of the component, wherein the in-band state save command is a command issued across a data channel between the storage system and the plurality of host systems, wherein the in-band state save command is sent from a storage controller of the storage system to the plurality of host systems in response to the failure condition being a failure of a storage device in the storage system;
each of the plurality of host systems runs one or more host applications, a host bus adapter driver, and a failover driver;
the in-band state save command is issued to the plurality of host systems via a multi-host system interface of the storage system which establishes a separate data channel with each of the host systems in the plurality of host systems;
responsive to each of the plurality of host systems receiving the in-band state save command at the respective host bus adapter and providing the in-band state save command to the respective failover driver, each of the plurality of host systems collects state save data and provides the collected state save data to the storage controller via the data channels established by the multi-host system interface; and
the state save data collected by each of the plurality of host systems is packaged together with state save data from the storage system into a single data package associated with the detected failure condition.

20. The system of claim 19, wherein a storage controller of the storage system:
requests a first state save operation in the plurality of host systems to thereby generate a plurality of host state save log data structures; and
requests a second state save operation in the storage system to thereby generate a storage system state save log data structure.

21. The system of claim 20, wherein the storage controller of the storage system:
packages the plurality of host state save log data structures with the storage system state save log data structure into a single state save package data structure that is stored in the storage system and is associated with the failure condition, wherein the storage system outputs the state save data for use in resolving the failure condition of the component by outputting the state save package data structure to a data processing system.

22. The system of claim 19, wherein the failover driver of a given host system receives the in-band state save command from the first data processing system, and wherein the host bus adapter driver of the given host system initiates a state save operation in the given host system in response to receipt of the in-band state save command.

\* \* \* \* \*